United States Patent Office 3,629,367
Patented Dec. 21, 1971

3,629,367
FIRE-RESISTANT POLYESTER COMPOSITIONS
Donald N. De Mott, Midland, Mich., assignor to The
Dow Chemical Company, Midland, Mich.
No Drawing. Filed July 22, 1969, Ser. No. 843,769
Int. Cl. C08f 21/00
U.S. Cl. 260—867
13 Claims

ABSTRACT OF THE DISCLOSURE

Fire-resistant, cross-linked polyester compositions are prepared by reacting a curable polyester resin with a vinylphosphonate of the formula

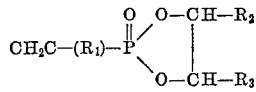

wherein $R_1$, $R_2$ and $R_3$ are hydrogen or hydrocarbon groups.

BACKGROUND OF THE INVENTION

The term curable polyester resin encompasses a large group of known synthetic resins having alcoholic hydroxyl groups and/or activated ethylenic groups which are almost all produced in the reaction between dibasic acids, or their alkali metal salts or anhydrides, and dihydric alcohols. In a few cases, trifunctional monomers of the acid or alcohol are used, such as citric acid and glycerol.

The term curable polyester resin particularly applies to polymers made using a mixture of unsaturated dibasic acids such as maleic acid, along with saturated dibasic acids. Polyester resins of this type contain several sites of ethylenic unsaturation along the polymer backbone and can be cross-linked by reaction with other unsaturated monomers, such as styrene. Generally, this cross-linking reaction is conducted in the presence of a free-radical-type curing agent, e.g., a peroxide.

It is also known that polymer systems in general which chemically contain phosphorus and/or halogen are more fire-resistant than analogous systems which do not contain phosphorus. However, previous methods of chemically combining phosphorus or phosphorus-containing compounds, e.g., bis-(2-bromoethyl)vinylphosphonate-into the polymer system has produced corrosive by-products, such as HBr which can degrade and discolor the polymer and cause it to be unsuitable for use.

SUMMARY OF THE INVENTION

It has now been discovered that novel fire-resistant, cross-linked polyester compositions are prepared in the novel process which comprises reacting by contacting a curable polyester resin with a vinyl-phosphonate having the structural formula

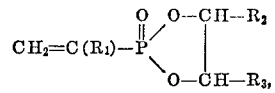

wherein $R_1$, $R_2$ and $R_3$ are hydrogen or hydrocarbon groups.

The vinylphosphonates are unique compounds which are simultaneously capable of cross-linking the polyester resins and chemically combining phosphorus into the polymer structure without producing any corrosive by-products and without causing any objectionable discoloration. The vinylphosphonates are thought to react in an addition reaction with the polyester hydroxyl groups through the cyclic ethylene group and then in another addition reaction with the vinyl group on other vinylphosphonate molecules and/or with any point of ethylenic unsaturation in the backbone of the polyester, or cross-linking comonomer such as styrene.

Suitable vinylphosphonates in the subject process have the structural formula

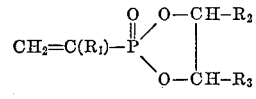

wherein $R_1$, $R_2$ and $R_3$ are hydrogen or hydrocarbon groups of 1 to about 6 carbons atoms. Preferably $R_1$ is hydrogen; and most preferably, $R_1$ is hydrogen and $R_2$ and $R_3$ are hydrogen or methyl. The vinylphosphonates are conveniently prepared by using the appropriate reactants in the method described by A. N. Pudovik, et al., Zh. Obshch. Khim. 36(2), 310(1966) (Chemical Abstracts 64:15916b), or by any one of the other known methods of preparing cyclic esters of vinylphosphonic acid. Examples of suitable polyester resins include the polymers formed by reacting phthalic acid, phthalic anhydride, isophthalic acid, adipic or azelaic acid with alkylene glycols, such as ethylene, propylene, butylene, diethylene, dipropylene glycol or glycerol, and also included are any one of the above reaction products wherein the dibasic acid reactant is a mixture of any of the above named acids or anhydrides and maleic acid, maleic anhydride or fumaric acid. Other suitable polyester resins are sometimes referred to as alkyd resins. Alkyd resins are essentially polyester resins within the above definition which are modified by (1) using a polyol rather than an alkylene glycol, or by (2) including a natural oil or acid derived from such a natural oil within the process e.g., linseed oil, linoleic acid, rosin or similar resins.

The vinylphosphonate, or a mixture of vinylphosphonates, is used in the subject process in a cross-linking amount, such as amounts up to about 20 weight percent, based on the weight of the polyester reactant(s), and they may be advantageously used in conjunction with other previously used cross-linking agents, such as styrene, to give the desired degree of cross-linking and fire-resistance.

Suitable reaction temperatures are between about 25° C. and about 225° C., and, when no catalyst is used, the temperature is preferably between about 100° C. and about 175° C. The process occurs at temperatures above about 225° C., but the exothermic reaction is difficult to control. Likewise, the process occurs at temperatures below about 25° C. but the reaction rate is quite low without the use of a catalyst.

A suitable catalyst in the subject process is any of the known class of free-radical catalysts. Typically, such catalysts are peroxides, and preferentially are cumene peroxide, benzoyl peroxide, t-butyl peroxide or potassium persulfate. It is preferred to include a catalytic amount of a free-radical catalyst in the subject process and to conduct the reaction at a lower temperature within the above range, e.g., from 50° C. to about 125° C.

Pressure on the subject process is not critical. Atmospheric pressure is convenient and therefore preferred.

The polyester resin and the vinylphosphonate should be maintained in contact at the selected reaction temperature until the desired cross-linked product is formed. A reaction time of a few minutes to a few hours is generally sufficient, e.g., about 15 minutes to about 24 hours.

SPECIFIC EMBODIMENT

The following example further illustrates the invention:

Polyester resin masterbatch—A polyester resin was prepared by (1) reacting at an elevated temperature an equimolar mixture of (a) phthalic anhydride, (b) maleic anhydride, and (c) propylene glycol, and 2,2-bis(bromoethyl)-1,3-propane diol (18.1 weight percent, based on total composition weight) to give a prepolymer; and (2) styrene monomer (30 weight percent, based on total composition weight) was added to the prepolymer to form the resin masterbatch.

A polyester control was prepared by mixing benzoyl peroxide (2 g.) into the resin masterbatch (200 g.).

A polyester test sample was prepared by mixing cyclic ethylene vinylphosphonate (50 g.) and benzoyl peroxide (2 g.) into the resin masterbatch (150 g.).

The polyester control and test sample were poured into glass plate molds and cured as follows: The molds were placed in a 40° C. oven and the temperature raised at a constant rate to 80° C. over a 1-hour period; the temperature was maintained at 80° C. for 30 minutes and then raised evenly to 120° C. over a 30-minute period. The castings were removed and observed to be clear and transparent. The physical properties of the above cured polyesters were determined and the results are tabulated below:

TABLE I

| Test | Polyester Control | Polyester Test sample |
|---|---|---|
| Hardness [1] | 45 | 49 |
| Flexural strength (p.s.i.) [2] | 10,230 | 14,890 |
| Yellowness index [3] | 3.59 | 2.51 |
| Yellowness index (aged) [4] | 15.48 | 14.66 |
| Flammability HLT 15 [5] | 24 | 100 |

[1] Hardness—as determined by the Barcol Hardness Impressor No. 934-1.
[2] Flexural strength—as determined by ASTM D-790 test procedure.
[3] Yellowness index—as determined by ASTM D-1925-63T test procedure.
[4] Yellowness index (aged)—determined pursuant to (3) above after the sample was aged 50 hours pursuant to the test method of ASTM D-1499 (part 27) in a Weather-O-Meter (a commonly used, commercially available instrument designed to test samples in the presence of air, water, and actinic light which is provided by a carbon arc).
[5] Flammability HLT 15—a standard test wherein (1) a direct flame is applied to the sample until ignition results, (2) the igniting flame is removed, (3) and the burn time is recorded. A rating of 100 indicates the best self-extinguishing property.

It was noted that the self-extinguishing time for the polyester test sample was essentially instantaneous even after five ignitions.

Similar fire-resistant, cross-linked polyester compositions are obtained by reacting other polyester resins with cyclic ethylene vinylphosphonate or other vinylphosphonates described above.

I claim:

1. A curable polyester resin having incorporated therein a cross-linking amount of a vinylphosphonate having the formula

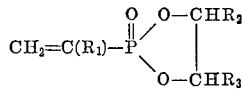

wherein $R_1$, $R_2$ and $R_3$ are hydrogen or hydrocarbon groups of from 1 to 6 carbon atoms; said polyester resin bearing a plurality of alcoholic hydroxyl groups or activated ethylenic groups, or a mixture of such groups.

2. A method of preparing a fire-resistant, cross-linked polyester resin composition comprising reacting by contacting a curable polyester resin with a cross-linking amount of a vinylphosphonate having the formula

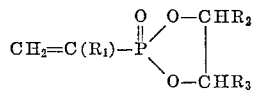

wherein $R_1$, $R_2$ and $R_3$ are hydrogen or hydrocarbon groups of from 1 to 6 carbon atoms; said polyester resin bearing a plurality of alcoholic hydroxy groups or activated ethylenic groups, or a mixture of such groups.

3. The method defined in claim 2 wherein $R_1$ is hydrogen.

4. The method defined in claim 3 wherein $R_2$ and $R_3$ are hydrogen or methyl.

5. The method defined in claim 2 wherein the reaction temperature is between 25° C. and 225° C.

6. The method defined in claim 4 wherein the temperature is between about 50° C. and about 175° C.

7. The method defined in claim 2 wherein the reaction is conducted in the presence of a catalytic amount of a free-radical catalyst.

8. The method defined in claim 7 wherein said catalyst is a peroxide.

9. The method defined in claim 8 wherein said catalyst is benzoyl peroxide.

10. The method defined in claim 9 wherein the reaction temperature is between about 50° C. and about 125° C., and $R_1$, $R_2$ and $R_3$ are each hydrogen.

11. A fire-resistant, cross-linked polyester composition produced by the method defined in claim 2.

12. A fire-resistant, cross-linked polyester composition produced by the method defined in claim 3.

13. A fire-resistant, cross-linked polyester composition produced by the method defined in claim 4.

References Cited

UNITED STATES PATENTS 3,043,821  7/1962  Coover et al. _____ 260—89.5
3,163,627  12/1964  Craver _____ 260—861

FOREIGN PATENTS 1,128,146  4/1962  Germany.
1,503,429  11/1967  France.

OTHER REFERENCES

Yuldashev et al., Dokl. Akad. Nauk Uz. SSR 21(10), 38–40 (1964) (Abstr. supp.)

Yuldashev et al., Dokl. Akad. Nauk Uz. SSR 23(6), 36–38 (1966) (Abstr. supp.)

MELVIN GOLDSTEIN, Primary Examiner

U.S. Cl. X.R.

260—22 CB, 870, DIG. 24

UNITED STATES PATENT OFFICE
CERTIFICATE OF CORRECTION

Patent No. 3,629,367　　　　　　　　　　Dated　7 December 1971

Inventor(s)　Donald N. DeMott

It is certified that error appears in the above-identified patent and that said Letters Patent are hereby corrected as shown below:

In column 1, in the Abstract of the Disclosure, change the formula between lines 14 and 17 to:

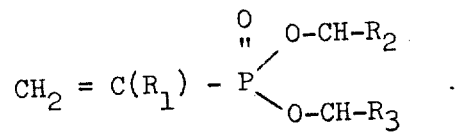

Signed and sealed this 13th day of June 1972.

(SEAL)
Attest:

EDWARD M. FLETCHER, JR.　　　　　ROBERT GOTTSCHALK
Attesting Officer　　　　　　　　Commissioner of Patents